Oct. 26, 1971  A. W. BARBER  3,615,162

SOUND INTENSITY INDICATOR SYSTEM

Filed April 11, 1969  3 Sheets-Sheet 1

INVENTOR.
Alfred W. Barber

INVENTOR.
Alfred W. Barber

United States Patent Office 3,615,162
Patented Oct. 26, 1971

3,615,162
SOUND INTENSITY INDICATOR SYSTEM
Alfred W. Barber, Bayside, N.Y.
(32—44 Francis Lewis Blvd., Flushing, N.Y. 11358)
Filed Apr. 11, 1969, Ser. No. 815,285
Int. Cl. G01h 1/08
U.S. Cl. 181—.5
7 Claims

ABSTRACT OF THE DISCLOSURE

Discrete sound levels are indicated by a series of lamps. Each lamp indicates a sound intensity within a predetermined range. Lamp colors are chosen to signify intensity classifications.

DESCRIPTION OF THE PRIOR ART

In the past sound level meters have used analog indicating meters with scales reading in db of sound intensity generally based on a 0 db level of 1 millibar per square centimeter. In order to cover a wide range of sound intensities several ranges are provided with switching means to change the response sensitivity. Such meters require manual switching the reading of a meter and other personal attention for proper operation. While the results may be accurate and scientific, they are complicated and undramatic.

SUMMARY

The present invention provides a sound intensity indicator with completely automatic operation and a dramatic and easily understood indicating system. Sound is picked up by means of a suitable microphone or similar transducer for converting sound pressures to voltage. The voltage thus generated is amplified, rectified and the rectified voltage is used to operate an electromechanical or electronic relay lighting an indicator lamp. A series of lamps are provided, each to be energized over a predetermined range of sound intensities. The lamp driving circuits are separated by amplifier stages, for example, each having a gain of 10 times. Thus, succeeding lamps light for each 20 db of added sound intensity.

As an example, a green lamp is energized for sound levels below a predetermined intensity, say 60 db at 60+20 or 80 db, a white lamp lights (average); at 80+20 or 100 db, a yellow lamp lights (too noisy); and at 100+20 or 120 db and above a red lamp lights (dangerous). Only one lamp is on at a time. Each lamp responds over a predetermined range of 20 db (other ranges may be chosen as 10 db per lamp and any desired number of lamps and colors may be used). The system operates automatically over any desired range without switching or any attention by an operator. The indication is interesting, meaningful and dramatic.

DESCRIPTION OF THE PREFERRED EMBODIMENTS

Figure 1:
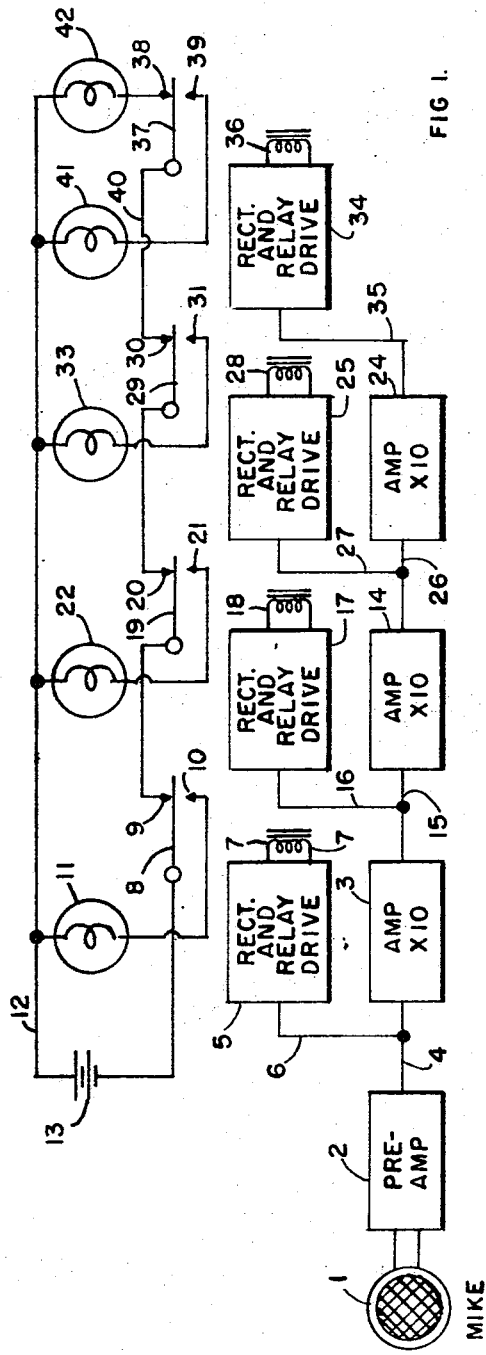
FIG. 1 is a circuit diagram, part block and part schematic, of the invention.

In FIG.1 a microphone 1 picks up the sound to be indicated. After amplification by means of a preamplifier 2, the sound induced signals are applied over line 4 to a first amplifier 2 having a predetermined gain (X10); over line 15 to a second amplifier 14 (X10); and over line 26 to a third predetermined gain amplifier 24. The output of amplifier 24 is applied over line 35 to rectifier and relay driver 34. Thus, when sound of greater than a predetermined intensity is intercepted by microphone 1, signals are generated and amplified to a point where relay 36 is energized. Sound levels 20 db higher will apply a signal over line 27 to rectifier and relay driver 25 energizing relay 28. Another increase of 20 db in sound intensity will apply sufficient signal over line 16 to rectifier and relay driver 17 to energize relay 18. Still another increase of 20 db will apply sufficient signal level over line 6 to rectifier and relay driver 5 to energize relay 7.

The lamp and relay switching circuit of FIG. 1 includes lamps 42, 41, 33, 22 and 11 switched by the switch contacts of relays 36, 28, 18 and 7 respectively. A suitable source of lamp voltage such as battery 13 is provided. One side of battery 13 is common to all the lamps over line 12. Initially lamp 42 is energized through the chain of energized relay switch contacts 8–9, 19–20, 29–30 and 37–38 connected in series by lines 23, 32 and 41. Lamp 42, when it is on, indicates sound intensities are below the predetermined minimum level. When the predetermined minimum level is exceeded and relay 36 is energized, relay switch arm 37 is pulled down closing contacts 37–39 and lamp 41 is energized visually showing a sound level above the predetermined minimum level at microphone 1. Lamp 41 remains on until the sound intensity has increased 20 db when relay 28 becomes energized closing contacts 29–31 and turning lamp 33 on (and lamp 41 off). Similarly, a further increase in sound level of 20 db energizes relay 18 closing contacts 19–21 and turning on lamp 22. A still, further increase in sound intensity picked up by microphone 1 energizes relay 7 closing contacts 8–10 and energizing lamp 11. Thus, lamp 42, when on, indicates sound levels below a predetermined level, lamp 41 sound levels over a 20 db range above this minimum, lamp 33 sound levels over an additional 20 db range, lamp 22 still another 20 db range and lamp 11 all sound intensities above the latter 20 db range.

It will be seen that there are a number of unique characteristics when compared with prior known systems. First, the system shows sound intensities in predetermined ranges by a visual indicator lamp. The lamp may have a particular color or may carry a letter, numeral or other designation. Only one lamp can be on at a time. A range indicator lamp is always on. The system covers any range of sound intensities and indicates each interval automatically without manual manipulation such as range switching. The indication is dramatic and easily appreciated by non-scientific users.

Figure 2:
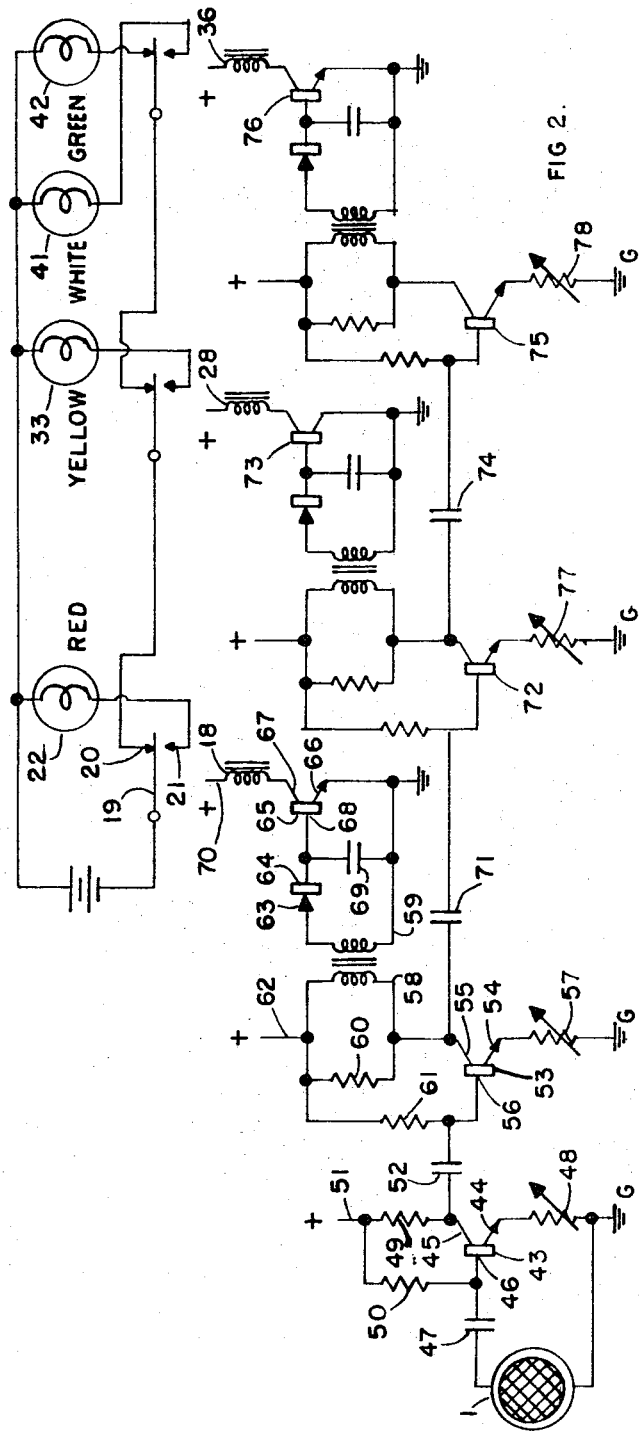
FIG. 2 is a schematic circuit diagram of one form of the invention employing relay controlled lamp switches.

In FIG. 2 a four range system is shown in detail. Microphone 1 is coupled through capacitor 47 to base 46 of transistor 43 forming a preamplifier stage. Collector 49 connected over line 51 to a suitable source of bias, not shown. Base 46 receives a suitable bias current through resistor 50 and emitter 44 is returned to ground through resistor 48 which may be variable to permit setting the gain at a desired point. The signals amplified by this preamplifier are applied through capacitor 52 to base 56 of amplifier transistor 53. Base 56 receives bias current through resistor 61. Emitter 54 is returned to ground G through resistor 57 which may be adjustable for adjusting gain. Collector 55 is loaded by primary 58 shunted by resistor 60 and is powered over line 62 from a suitable bias source, not shown. The amplified signals across primary 58 induce voltages in secondary 59 which are rectified by rectifier 63–64 and filtered by capacitor 69 produce a DC bias on base 68 of transistor 65. Emitter 66 is connected to ground. Collector 67 drives relay 18. Bias is supplied over line 70 from a suitable source, not shown.

The amplified signals at collector 55 are applied through capacitor 71 to the base of a third amplifier transistor 72, similarly driving a relay 28 by means of transistor 73. The emitter of transistor 72 is returned to ground through resistor 77 which may be variable for gain setting purposes. Amplified signals at the collector of transistor 72 are applied through capacitor 74 to the base of still another amplifier transistor 75 driving still another relay 36 by means of transistor 76. The emitter of transistor 75 is returned to ground through resistor 78 which may be adjustable for gain setting purposes. This detailed circuit operates as described above in connection with FIG. 1. Corresponding parts bear the same numbers.

Specifically describing the operation of transistors 53 and 65. Signals amplified by transistor 53 and rectified by rectifier 63–64 bias transistor 65 into conduction energizing relay 18 and closing contacts 19–21 light "red" lamp 22 indicating sound intensities above a predetermined level. Thus, "green" lamp 42 indicates sound levels below a predetermined level, say 60 db. If the gain of amplifiers 72 and 75 is 20 db, "white" lamp 41 glows from 60–80 db, "yellow" lamp 33 from 80–100 db and "red" lamp 22 above 100 db.

Figure 3:
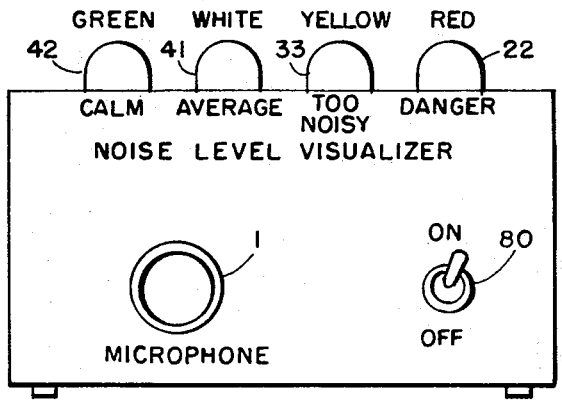
FIG. 3 is an external view of one form of the invention.

FIG. 3 is a view of the external appearance of one form of the present invention. A cabinet 79 carries on its upper side the four sound intensity indicator lamps 22, 33, 41 and 42 and on its front panel microphone 1 and power switch 80. Lamp 42 (green) may be labeled appropriately "calm" or "quiet," lamp 41 (white) "average," lamp 33 (yellow) "noisy" or "too noisy" and lamp 22 (red) "dangerous."

Figure 4:
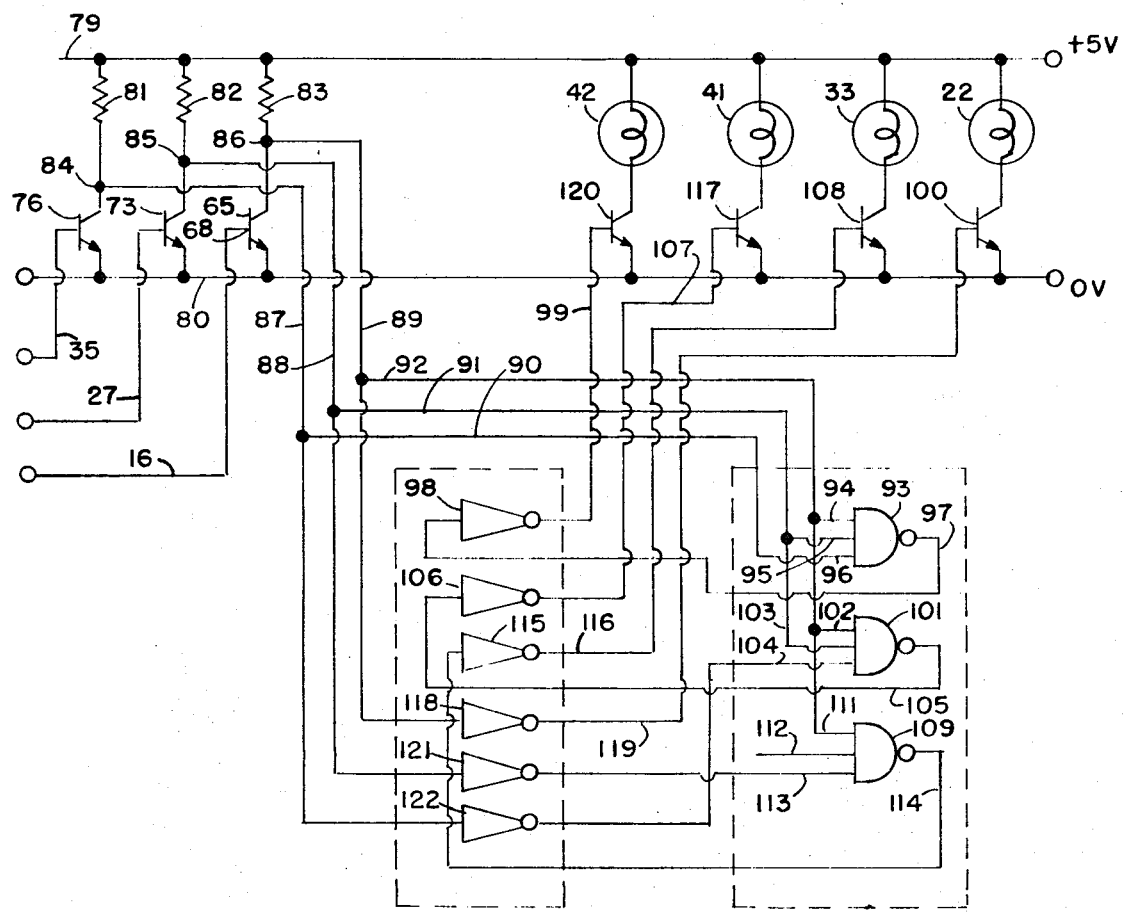
FIG. 4 is part schematic, part block diagram of an all electronic lamp drive system in accordance with the present invention.

In FIG. 4 an all electronic circuit is shown for driving the lamps in which the electro-mechanical relays are replaced by resistor-transistor logic (RTL) circuits. The input lines to the bases of transistors 65, 73 and 76 correspond to the lines of FIG. 2 carrying the DC rectified signals. These transistors instead of driving relays are loaded with collector resistors 81, 82 and 83 respectively so that when a DC signal is applied to the base, the corresponding collector is pulled down at 84, 85 or 86 placing a negative going signal on lines 87, 88 and 89 respectively. Lines 87, 88 and 89 feed inverters 122, 121 and 118 and over branch lines 90, 91 and 92 apply three inputs directly to NAND gate 93 over lines 96, 95 and 94, apply two inputs (lines 91 and 92) over lines 103 and 102 to NAND gate 101 and one input (line 92) over line 111 to NAND gate 109. The signal on line 87 is inverted by inverter 122 and is applied to NAND gate 101 over line 104. The signal on line 88 is inverted by inverter 121 and is applied to NAND gate 109 over line 113. Line 112 remains unconnected.

Lamps 22, 33, 41 and 42 (using the same numbers for lamps corresponding with those of FIG. 2) are connected from positive line 79 through energizing transistors 100, 108, 117 and 120 to zero line 80. When no DC signals are received at the bases of transistors 65, 73 and 76, lamp 42 is turned on by the output of NAND gate 101 over line 97 inverted by inverter 98 and applied to the base of transistor 120 over line 99. When a DC signal, due to the minimum sound level to be indicated, appears at the base of transistor 76, line 87 is pulled down, NAND gate 93 opens extinguishing lamp 42, the signal on line 87 is inverted by inverter 122 so that the inputs to NAND gate 101 are all positive and the output over line 105, inverted by inverter 106 and applied to the base of transistor 117 over line 107 lights lamp 41. When the second sound intensity level to be indicated is reached, a DC signal appears at the base of transistor 73, line 88 is pulled down, the signal on line 88 is inverted by inverter 121 and is applied to NAND gate 109 where combined with the signal (positive) on line 89–92–111 causes an output to appear on line 114 which inverted by inverter 115 and applied to the base of transistor 108 over line 116 lights lamp 33. When the third sound intensity level to be indicated is reached, a DC signal at the base of transistor 65 pulls down the voltage on line 89 which inverted by inverter 118 and applied over line 119 to the base of transistor 100 lights lamp 22. It will be seen that each of these signal conditions is exclusive in that only one lamp can be lighted at any given time. Thus, I have shown and described an electronic switching system equivalent to the relay switching of FIG. 2. Any desired number of lamps can be added by extending the number of amplifier stages and relays or logic circuit drives. Thus, my sound level indicator may be provided with 20 db steps, 10 db steps or any desired equal or unequal steps, any desired first step level and final maximum level indication.

Figure 5:
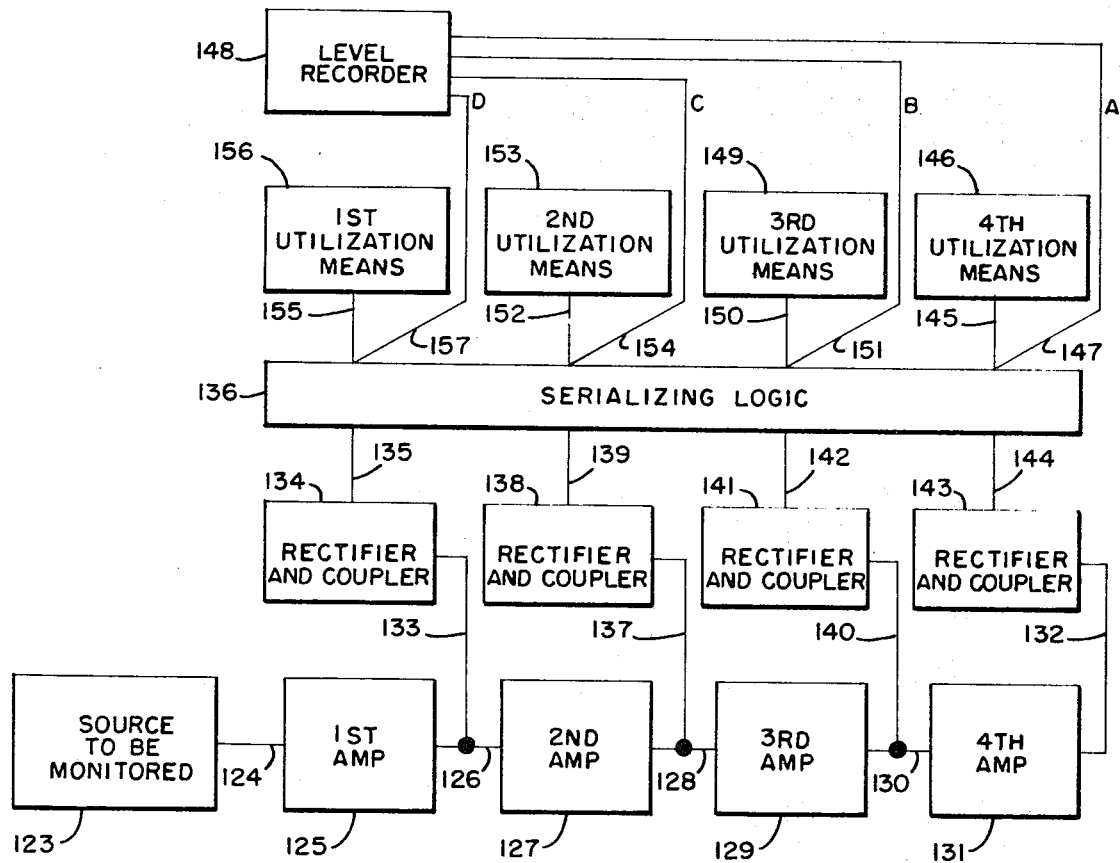

FIG. 5 illustrates a more generalized form of the invention in block form. A source of signals 123, as from transducer, are applied over line 124 to a first amplifier 125; the output of amplifier 125 is applied over line 126 to second amplifier 127; the output of amplifier 127 is applied to third amplifier 129 over line 128; and the output of amplifier 129 is applied to fourth amplifier 131 over line 130. While four cascaded amplifiers have been shown, any desired number of amplifiers may be employed in the cascade string. The output of amplifier 131 is applied over line 132 to rectifier-coupler 143; the output of amplifier 129 is applied over line 140 to rectifier-coupler 141; the output of amplifier 127 is applied over line 137 to rectifier-coupler 138; and the output of amplifier 125 is applied over line 133 to rectifier-coupler 134. The output of rectifier-coupler 143 is applied over line 144 to the serializing logic unit 136; the output of rectifier-coupler 141 is applied over line 142; the output of rectifier-coupler 138 over line 139 and the output of rectifier-coupler 134 over line 135. Serializing logic unit 136 feeds utilization means 146 over line 145, utilization means 149 over line 150, utilization means 153 over line 152 and utilization means 156 over line 155.

FIG. 5 is a generalization of the specific embodiment described above. The discrete steps are determined by the gain of the individual amplifier stages. The utilization means may be any desired indicating, display or other utilization means. The transducer signals may be from any desired wide range signal source to be monitored step-by-step. The serializing logic connects the utilization means step-by-step so that the lower level signals actuate utilization means 146, the next level, utilization means 149 and so on. Electro-mechanical and all electronic logic have been shown and described above for accomplishing this step-by-step exclusive switching.

Figure 6:
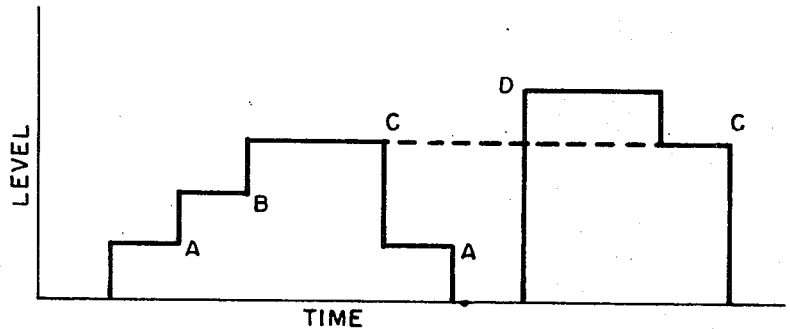

FIG. 5 also shows a recorder 148 coupled over lines 147, 151, 154 and 157 to lines 145, 150, 152 and 155 to the series of utilization means respectively. These lines are also labeled A, B, C and D. A typical recording is shown in FIG. 6. The discrete levels are recorded at the predetermined levels A, B, C and D. It will be obvious how the input signals to the recorder can be added to provide these equal increments or, for that matter, weighted increments as desired.

I claim:
1. In a sound intensity indicating system, the combination of:
   a microphone;
   a multistage cascade amplifier coupled to said microphone;
   a plurality of lamp indicators;
   lamp energizing means sequentially coupling said lamps exclusively and individually with predetermined stages of said amplifier for energizing said lamps individually and exclusively in response to discrete predetermined sound levels at said microphone whereby said lamps are sequentially and exclusively energized in response to predetermined discrete sound levels impinging upon said microphone; and wherein said lamp energizing means includes a series connected chain of single pole double throw relay switches.

2. In a sound intensity indicating system, the combination of:
- a microphone;
- a multistage cascade amplifier coupled to said microphone;
- a plurality of lamp indicators;
- lamp energizing means sequentially coupling said lamps exclusively and individually with predetermined stages of said amplifier for energizing said lamps individually and exclusively in response to discrete predetermined sound levels at said microphone whereby said lamps are sequentially and exclusively energized in response to predetermined discrete sound levels impinging upon said microphone; and
- wherein said lamp energizing means includes a solid state exclusive OR logic circuit.

3. In a signal level monitoring system, the combination of:
- a source of wide amplitude range signals to be monitored;
- a plurality cascaded signal amplifiers of predetermined gain characteristics each amplifier including an input terminal and an output terminal;
- means coupling the input terminal of the first amplifier to the signal source;
- means coupling the output terminal of each amplifier with the input terminal of the next succeeding amplifier except the last amplifier;
- serializing logic means adapted to accept a plurality of inputs and to provide at a plurality of exclusive outputs, signals in predetermined response to said input signals;
- individual coupling means between said amplifier output terminals and the inputs to said serializing logic; and
- a plurality of indicating means individually coupled to the outputs of said serializing logic means for indicating predetermined discrete levels of said monitored signals.

4. A signal level monitoring system as set forth in claim 3, and including:
- recording means coupled to the outputs of said serializing logic means adapted to provide a distinctive mark for each of said discrete levels of said monitored signal.

5. A signal level monitoring system as set forth in claim 3:
- wherein said coupling means between said amplifiers and said serializing logic means include rectifiers for converting AC signals to DC signals.

6. A signal level monitoring system as set forth in claim 3:
- wherein said signal source is a transducer for converting a physical force to an electrical signal.

7. A signal level monitoring system as set forth in claim 3:
- wherein said signal source is a source of AC signals, said amplifiers are AC amplifiers and said coupling means between said amplifiers and said serializing logic means include rectifiers for converting the amplified AC signals to DC signals for application to said logic means.

References Cited

UNITED STATES PATENTS

| | | | |
|---|---|---|---|
| 2,884,085 | 4/1959 | Von Wittern et al. | 181—0.5 |
| 3,200,899 | 8/1965 | Krauss | 181—0.5 |

RODNEY D. BENNETT, JR., Primary Examiner

W. T. RIFKIN, Assistant Examiner

U.S. Cl. X.R.

340—15